(12) United States Patent
Chen et al.

(10) Patent No.: US 8,953,701 B2
(45) Date of Patent: Feb. 10, 2015

(54) PRECODING METHOD AND PRECODER FOR CROSS-POLARIZED ANTENNA ARRAY

(75) Inventors: Jinhui Chen, Shanghai (CN); Lu Wu, Shanghai (CN); Yang Song, Shanghai (CN); Hongwei Yang, Shanghai (CN); Di Lv, Shanghai (CN); Hao Liu, Shanghai (CN)

(73) Assignee: Alcatel Lucent, Boulogne-Billancourt (FR)

( * ) Notice: Subject to any disclaimer, the term of this patent is extended or adjusted under 35 U.S.C. 154(b) by 27 days.

(21) Appl. No.: 13/977,846

(22) PCT Filed: Jan. 3, 2012

(86) PCT No.: PCT/IB2012/000060
§ 371 (c)(1),
(2), (4) Date: Jul. 1, 2013

(87) PCT Pub. No.: WO2012/093332
PCT Pub. Date: Jul. 12, 2012

(65) Prior Publication Data
US 2013/0279619 A1    Oct. 24, 2013

(30) Foreign Application Priority Data

Jan. 4, 2011    (CN) .......................... 2011 1 0002379

(51) Int. Cl.
*H04B 7/02*    (2006.01)
*H04B 7/04*    (2006.01)
(Continued)

(52) U.S. Cl.
CPC ............ *H04B 7/0478* (2013.01); *H04B 7/0469* (2013.01); *H04B 7/0634* (2013.01); *H04B 7/10* (2013.01)
USPC ....................................................... 375/267

(58) Field of Classification Search
CPC .. H04B 7/0639; H04B 7/0456; H04B 7/0469; H04B 7/0673; H04B 7/0478; H04B 7/061; H04B 7/0665; H04L 25/03343

USPC ................ 375/260, 267, 295, 299, 316, 358; 455/68–69, 101

See application file for complete search history.

(56) References Cited

U.S. PATENT DOCUMENTS 7,809,074 B2 *   10/2010   Kotecha et al. ............... 375/267
7,895,044 B2 *   2/2011    Lin et al. ...................... 704/500
(Continued)

OTHER PUBLICATIONS

Alcatel-Lucent Shanghai Bell et al., "Discussion of two-stage feedback proposals," $3^{rd}$ Generation Partnership Project (3GPP), 3GPP TSG WG1 Meeting #61bis, R1-104088, XP050449535, 9 pages, Dresden, Germany, Jun. 28-Jul. 2, 2010.
(Continued)

*Primary Examiner* — Khanh C Tran
(74) *Attorney, Agent, or Firm* — Fay Sharpe LLP

(57) ABSTRACT

The present invention provides a precoding method for a cross-polarized antenna array, the cross-polarized antenna array comprising a first group of coplanar polarized antennas and a second group of coplanar polarized antennas, the method comprising the following steps: generating, for at least one layer of data stream, a feedback codebook comprising a plurality of codewords; receiving a selection of the codeword in the feedback codebook; determining a corresponding codeword from the feedback codebook according to the received selection; generating a precoding matrix based on the determined codeword to precode the at least one layer of data stream; wherein each codeword in the feedback codebook comprises a first coefficient portion corresponding to a first group of coplanar polarized antennas and a second coefficient portion corresponding to the second group of coplanar polarized antennas, and there is a complex scaling relation between the coefficients in the first coefficient portion and the second coefficient portion corresponding to the same layer of data stream. Correspondingly, the present invention further provides a precoder for a cross-polarized antenna array.

16 Claims, 2 Drawing Sheets

(51) Int. Cl.
*H04B 7/06* (2006.01)
*H04B 7/10* (2006.01)

(56) References Cited

U.S. PATENT DOCUMENTS

| | | | |
|---|---|---|---|
| 8,073,069 B2* | 12/2011 | Mundarath et al. | 375/267 |
| 8,306,146 B2* | 11/2012 | Heath et al. | 375/285 |
| 2008/0304463 A1* | 12/2008 | Borkar et al. | 370/342 |
| 2010/0284484 A1* | 11/2010 | Jongren et al. | 375/267 |
| 2011/0150052 A1* | 6/2011 | Erell et al. | 375/267 |
| 2011/0249712 A1* | 10/2011 | Hammarwall et al. | 375/220 |

OTHER PUBLICATIONS

Catt, "Codebook design for 8TxxDL MIMO," $3^{rd}$ Generation Partnership Project (3GPP), 3GPP TSG WG1 Meeting #59b, R1-100022, XP050417778, 13 pages, Valencia, Spain, Jan. 18-22, 2010.

International Search Report for PCT/IB2012/000060 dated Apr. 12, 2012.

* cited by examiner

PRECODING METHOD AND PRECODER FOR CROSS-POLARIZED ANTENNA ARRAY

FIELD OF THE INVENTION

The present invention relates to communication technologies, and particularly to a preceding method and a precoder for a cross-polarized antenna array using a complex scaling-based feedback codebook.

BACKGROUND OF THE INVENTION

Cross-polarized linear antenna array will be widely employed in LTE systems. The cross-polarized linear antenna array can be considered as two groups of coplanar polarized antennas, antennas in each group being on the same polarization.

The channel characteristics of the cross-polarized linear antenna array are illustrated in the following. The channel h of the cross-polarized linear antenna array can be represented by:

$$h = \begin{pmatrix} h_1 \\ h_2 \end{pmatrix}$$

where $h_1$ represents a sub-channel of the first group of antennas on one polarization and $h_2$ represents a sub-channel of the second group of antennas on the other polarization.

From the following documents, straightforwardly, in the case of no scattering, there exists a complex scaling factor between $h_1$ and $h_2$, $$\beta' e^{j\delta'} = \frac{h_2}{h_1}$$

with β denoting the modulus and δ denoting the phase.

Documents:

L. Jiang, L. Thiele, and V. Jungnickel, "On the Modelling of Polarized MIMO Channel," 13th European Wireless Conference, Paris, France, April 2007.

L. Jiang, L. Thiele, and V. Jungnickel, "Polarization Rotation Evaluation for Macrocell MIMO Channel," in Proc. IEEE ISWCS, Italy, September 2009.

Efficient feedback codebooks and precoders are required to do single user or multi-user precoding with cross-polarized linear antenna array.

Currently, discussions in 3GPP on LTE-A, various feedback schemes have been proposed for cross-polarized linear antenna array. In R1-103026, "Views on the feedback framework for Rel 10", Samsung, 3GPP TSG RAN1 WG1 61 and R1-101742, "Further refinements of feedback framework", Ericsson, 3GPP TSG RAN1 WG1 60b, the generated precoder matrix F is in the form of co-phasing:

$$F = \begin{pmatrix} f'_1 & \cdots & f'_L \\ e^{j\delta'_1} f'_1 & \cdots & e^{j\delta'_L} f'_L \end{pmatrix} \quad (1)$$

wherein F is a precoding matrix of size M'×L' with the number of antennas and L' the number of data stream layers, $(f_1 \ldots f_L)$ is the upper sub-matrix of F of size M'/2×L' representing the precoding matrix for the first group of antennas and $(e^{j\delta'_1} f_1 \ldots e^{j\delta'_L} f_L)$ is the lower sub-matrix of F of size M'/2×L' representing the precoding matrix for the second group of antennas with $\delta'_1, \ldots, \delta'_L$ a non-negative real number.

However, the form of precoder in equation (1) does not fully match the channel characteristics with cross-polarized linear antenna array. System performance can be further improved by designing better feedback codebook to match the channel characteristics.

Therefore, though various feedback schemes have been proposed, the current schemes cannot fully match channel characteristics of cross-polarized linear antenna array and thus cannot work efficiently.

SUMMARY OF THE INVENTION

An object of the present invention is to provide a precoding method and a precoder for a cross-polarized antenna array to solve the above problems in the prior art.

According to one aspect of the present invention, there is provided a precoding method for a cross-polarized antenna array, the cross-polarized antenna array comprising a first group of coplanar polarized antennas and a second group of coplanar polarized antennas, the method comprising the following steps: generating, for at least one layer of data stream, a feedback codebook comprising a plurality of codewords; receiving a selection of the codeword in the feedback codebook; determining a corresponding codeword from the feedback codebook according to the received selection; generating a precoding matrix based on the determined codeword to precode the at least one layer of data stream; wherein each codeword in the feedback codebook comprises a first coefficient portion corresponding to a first group of coplanar polarized antennas and a second coefficient portion corresponding to the second group of coplanar polarized antennas, and there is a complex scaling relation between the coefficients in the first coefficient portion and the second coefficient portion corresponding to the same layer of data stream.

Preferably, the complex scaling relation comprises amplitudes and phases; the coefficient in the feedback codebook corresponding to each layer of data stream is generated according to a plurality of complex scaling coefficients consisting of a plurality of candidate amplitudes and a plurality of candidate phases, and a plurality of candidate single-polarized coefficients.

Preferably, the plurality of candidate amplitudes are pre-set according to channel characteristics of the cross-polarized antenna array.

Preferably, the plurality of candidate amplitudes can include 1 and/or a pair of values which are mutually reciprocal.

Preferably, the plurality of candidate phases comprise phase values evenly distributed in a predetermined range.

Preferably, the predetermined range is 0 to 2π.

Preferably, the cross-polarized antenna array is a closely spaced-apart linear antenna array. The first coefficient portion and/or the second coefficient portion comprise Discrete Fourier Transformation DFT vectors.

Preferably, selection of the codeword includes an index of the codeword in the feedback codebook.

According to another aspect of the present invention, there is provided a precoder for a cross-polarized antenna array, the cross-polarized antenna array comprising a first group of coplanar polarized antennas and a second group of coplanar polarized antennas, the precoder comprising: a feedback codebook generating unit configured to generate, for at least one layer of data stream, a feedback codebook comprising a plurality of codewords; a receiving unit configured to receive a selection of the codeword in the feedback codebook; a determining unit configured to determine a corresponding codeword from the feedback codebook according to the selection received by the receiving unit; and a precoding unit configured to generate a precoding matrix based on the codeword determined by the determining unit to precode the at least one layer of data stream; wherein the feedback codebook generating unit is configured such that each codeword in the generated feedback codebook comprises a first coefficient portion corresponding to the first group of coplanar polarized antennas and a second coefficient portion corresponding to the second group of coplanar polarized antennas, and there is a complex scaling relation between the coefficients in the first coefficient portion and the second coefficient portion corresponding to the same layer of data stream.

Preferably, the complex scaling relation comprises amplitudes and phases; the feedback codebook generating unit is configured to generate a coefficient in the feedback codebook corresponding to each layer of data stream according to complex scaling coefficients consisting of a plurality of candidate amplitudes and a plurality of candidate phases, and a plurality of candidate single-polarized coefficients.

Preferably, the feedback codebook generating unit is configured to set the plurality of candidate amplitudes according to channel characteristics of the cross-polarized antenna array.

Preferably, the feedback codebook generating unit is configured to set the plurality of candidate amplitudes to include 1 and/or a pair of values which are mutually reciprocal.

Preferably, the feedback codebook generating unit is configured to set the plurality of candidate phases to be phase values evenly distributed in a predetermined range.

Preferably, the predetermined range is 0 to $2\pi$.

Preferably, the cross-polarized antenna array is a closely spaced-apart linear antenna array. The first coefficient portion and/or the second coefficient portion comprise Discrete Fourier Transformation DFT vectors.

Preferably, the receiving unit is configured to receive an index in the feedback codebook.

The precoder and the precoding method according to the present invention can completely match the channel characteristics of the cross-polarized linear antenna array so as to achieve a better coding performance. On the other hand, since the codebook size for achieving the same performance is smaller, the precoding scheme of the present invention has a less feedback overhead and low computational complexity.

BRIEF DESCRIPTION OF THE ACCOMPANYING DRAWINGS

DETAILED DESCRIPTION OF PREFERRED EMBODIMENTS

Specific embodiments of the present invention will be described in detail with reference to the figures, but the protection scope of the present invention is not limited to the following embodiments.

Figure 1:
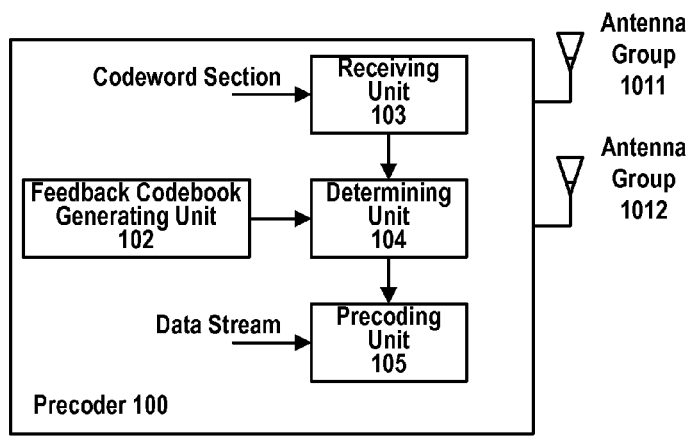
FIG. 1 illustrates a schematic block diagram of a precoder according to an embodiment of the present invention.

Referring to FIG. 1, FIG. 1 illustrates a schematic block diagram of a precoder 100 according to an embodiment of the present invention. As shown in FIG. 1, the precoder 100 comprises: a cross-polarized antenna array which further comprises a first antenna group 1011 and a second antenna group 1012; a feedback codebook generating unit 102; a receiving unit 103; a determining unit 104; and a precoding unit 105.

The first antenna group 1011 and the second antenna group 1012 are respectively comprised of corresponding coplanar polarized antennas. A polarization direction of the first antenna group 1011 is perpendicular to a polarization direction of the second antenna group 1012, thereby constituting the cross-polarized antenna array.

The feedback codebook generating unit 102 is configured to generate a feedback codebook comprising a plurality of code words for at least one layer of data stream so that each code word in the generated feedback codebook comprises a first coefficient portion corresponding to the first antenna group 1011 and a second coefficient portion corresponding to the second antenna group 1012, and there is a complex scaling relation between the coefficients in the first coefficient portion and the second coefficient portion corresponding to the same layer of data stream.

Specifically, in one embodiment, it is assumed there are L layers of data stream (L≥1), the number of antennas in the cross-polarized antenna array is M, and the antenna group 1011 and the antenna group 1012 respectively comprise M/2 antennas. With respect to the L layers of data stream, the feedback codebook generating unit 102 generates a feedback codebook W including K (K≥1) code words. Each codeword $W_k$ in the generated feedback codebook is denoted as below:

$$W_k = \begin{pmatrix} w'_{1,k} & \cdots & w'_{L,k} \\ \beta_{1,k} e^{j\delta_{1,k}} w'_{1,k} & \cdots & \beta_{L,k} e^{j\delta_{L,k}} w'_{L,k} \end{pmatrix}, k = 0, \ldots K-1 \quad (2)$$

Wherein the size of the codeword matrix $W_k$ is M×L, and k is an index of the codeword in the codebook W; $(w'_{1,k} \cdots w'_{L,k})$ is an upper sub-matrix of $W_k$, has a size of M/2×L and forms the first coefficient portion corresponding to the first antenna group 1011, wherein an element $w'_{i,k}$ represents a single-polarized coefficient with an index k for the $i^{th}$ layer of data stream; $(\beta_{1,k} e^{j\delta_{1,k}} w'_{1,k} \cdots \beta_{L,k} e^{j\delta_{L,k}} w'_{L,k})$ is a lower sub-matrix of $W_k$, has a size of M/2×L and forms the second coefficient portion corresponding to the second antenna group 1012, wherein an element $\beta_{i,k} e^{j\delta_{i,k}} w'_{i,k}$ represents a single-polarized coefficient with an index k for the $i^{th}$ layer of data stream. It can be seen that there is a complex scaling relation between the coefficients in the first coefficient portion and the second coefficient portion corresponding to the same layer of data stream. The complex scaling relation comprises an amplitude $\beta$ and a phase $\delta$, wherein $\beta_{1,k}, \ldots, \beta_{L,k}$ and $\delta_{1,k}, \ldots, \delta_{L,k}$ are non-negative real numbers.

In one embodiment, the feedback codebook generating unit 102 is configured to generate a coefficient in the feedback codebook corresponding to each layer of data stream according to a plurality of complex coefficients consisting of a plurality of candidate amplitudes and a plurality of candidate phases, and a plurality of candidate single polarized coefficients. Specifically, in regard to the portion in the codebook corresponding to the $i^{th}$ data stream, the feedback codebook generating unit 102 generates $n_1 n_2 n_3$ different precoding coefficients based on n1 candidate $\beta$ values, n2 candidate $\delta$ values and n3 candidate single-polarized coefficients $w'_i$. The feedback codebook generating unit 102 performs a similar precoding coefficient generating procedure for the L layers of data stream to constitute a final feedback codebook W.

In one embodiment, the feedback codebook generating unit 102 is configured to pre-set the above plurality of candidate amplitudes according to the channel characteristics of the cross-polarized antenna array.

In one embodiment, the feedback codebook generating unit 102 is configured to set the above plurality of candidate amplitudes to include 1 and/or a pair of values which are mutually reciprocal.

In one embodiment, the feedback codebook generating unit 102 is configured to set the above plurality of candidate phases to be phase values evenly distributed in a predetermined range, wherein the predetermined range can be 0 to $2\pi$.

In one embodiment, the cross-polarized antennal array is a closely spaced-apart linear antenna array. At this time, the first coefficient portion ($w'_{1,k} \ldots w'_{L,k}$) and/or the second coefficient portion ($\beta_{1,k}e^{j\delta_{1,k}}w'_{1,k} \ldots \beta_{L,k}e^{j\delta_{L,k}}w'_{L,k}$) comprise Discrete Fourier Transformation DFT Vectors.

The receiving unit 103 is configured to receive a selection of the codeword in the feedback codebook. In one embodiment, the receiving unit 103 receives the index k in the feedback codebook W.

The determining unit 104 is configured to determine a corresponding codeword in the feedback codebook W according to the received selection. In one embodiment, when the receiving unit 103 receives the index k, the determining unit 104 can directly use the codeword $W_k$ with the index k in the feedback codebook, or determine the codebook to be used according to other criteria in combination with the feedback codeword.

The precoding unit 105 is configured to generate a precoding matrix based on the codeword determined by the determining unit to precode the data stream.

Figure 2:
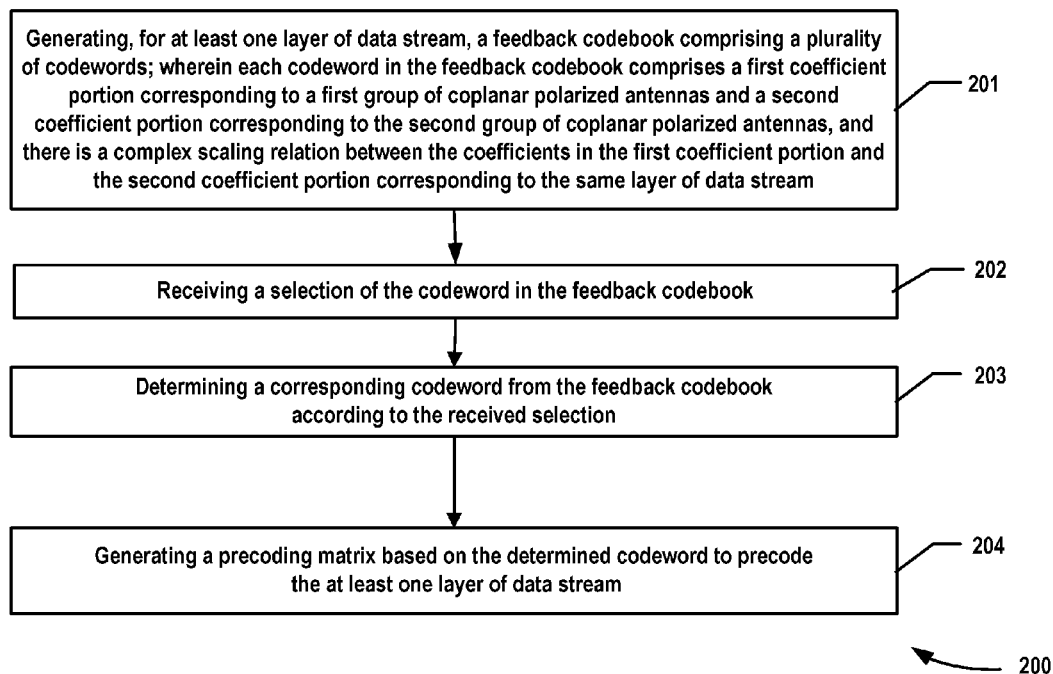
FIG. 2 illustrates a flow chart of a precoding method according to an embodiment of the present invention.

Referring to FIG. 2, FIG. 2 illustrates a flow chart of a precoding method 200 according to an embodiment of the present invention. The precoding method 200 can be used for the cross-polarized antenna array as shown in FIG. 1. The cross-polarized antenna array comprises a first group of coplanar polarized antennas and a second group of coplanar polarized antennas. The precoding method 200 can be performed by the precoder 100 as shown in FIG. 1 and comprises the following steps.

In step 201, the feedback codebook generating unit 102 is configured to generate for at least one layer of data stream a feedback codebook comprising a plurality of codewords, wherein each codeword in the feedback codebook comprises a first coefficient portion corresponding to the first group of coplanar polarized antennas and a second coefficient portion corresponding to the second group of coplanar polarized antennas, and there is a complex scaling relation between the coefficients in the first coefficient portion and the second coefficient portion corresponding to the same layer of data stream.

Herein, the complex scaling relation comprises amplitudes and phases. The coefficient in the feedback codebook corresponding to each layer of data stream is generated according to a plurality of candidate amplitudes, a plurality of candidate phases and a plurality of candidate single-polarized coefficients. In this case, the plurality of candidate amplitudes can be pre-set according to the channel characteristics of the cross-polarized antenna array. In addition, preferably the plurality of candidate amplitudes can include 1 and/or a pair of values which are mutually reciprocal. Preferably the plurality of candidate phases can comprise phase values evenly distributed in a predetermined range, wherein the predetermined range can be 0 to $2\pi$.

Preferably, the cross-polarized antenna array utilizing the precoding method 200 can be a closely spaced-apart linear antenna array. In this case, the first coefficient portion and/or the second coefficient portion comprise Discrete Fourier Transformation DFT vectors.

In step 202, the receiving unit 103 is configured to receive a selection of the codeword in the feedback codebook. Here, selection of the codeword includes an index of the codeword in the feedback codebook.

In step 203, the determining unit 104 is configured to determine a corresponding codeword in the feedback codebook according to the received selection.

In step 204, the precoding unit 105 is configured to generate a precoding matrix based on the determined codeword to precode the at least one layer of data stream.

Figure 3:
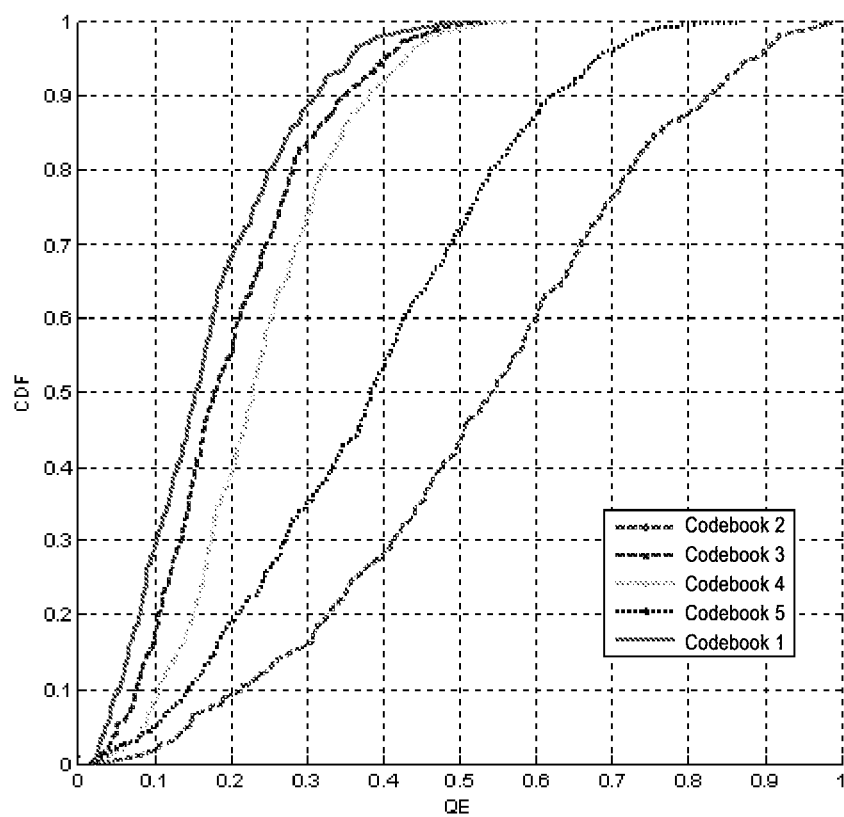
FIG. 3 illustrates a chart showing a comparison of performance between a codebook according to the principles of the present invention and a comparative codebook.

Then, analysis of performance of the precoding scheme according to the present invention is presented as below. FIG. 3 illustrates a comparison of performance between a precoding scheme using the codebook according to the principles of the present invention and a precoding scheme using a comparative codebook in a one-stage feedback system.

In the exemplary one-stage feedback system, assume a base station eNodeB has eight cross-polarized antenna array elements, with an interval of 0.5 wavelengths between the antenna array elements, and meanwhile, assume a total feedback overhead be limited to eight bits and the number of layers of data stream be one. It is noted that the configuration here is only for illustrative purpose and those skilled in the art appreciate that the number of antennas, the interval of antennas, the feedback overhead and the number of layers of data stream according to the present invention are not limited to the above values. For example, the present invention can be applied to the situation in which there are L layers of data stream ($(L \geq 1)$.

According to the present invention, the exemplary feedback codebook (Codebook 1) is designed as below:

Since it is assumed that L=1, the above formula (2) is simplified as below:

$$W_k = \begin{pmatrix} w'_k \\ \beta_k e^{j\delta_k} w'_k \end{pmatrix}, k = 0, \ldots K-1 \quad (3)$$

Herein, assume $\beta_k$ is selected from a universal set $A_\beta = \{\beta_0=0.5, \beta_1=1, \beta_2=2, \beta_3=4\}$ of the candidate $\beta_k$ values; $\delta_k$ is selected from a universal set $A_\delta = \{\delta_{k_2}=k_2\pi/4, k_2=0, \ldots, 2^3-1\}$ of the candidate $\delta_k$ values; the single-polarized coefficient $w'_k$ is selected from a universal set $A_w = \{w'_{k_3}=[1, e^{-j\pi k_3}/4, e^{-j3\pi k_3}/4]^T, k_3=0, \ldots, 2^3-1\}$ of candidate $w'_k$ values. In this way, the generated Codebook 1 is shown in Table 1 below.

TABLE 1

Codebook 1 (recommended)

| Codeword index | Codeword matrix |
|---|---|
| $i = 0, \ldots, 2^8 - 1$ | $w_i = \dfrac{1}{2\sqrt{\beta_{m_1}^2 + 1}} \begin{pmatrix} w'_{m_3} \\ \beta_{m_1} e^{j\delta_{m_2}} w'_{m_3} \end{pmatrix}$ with $m_1 = \lfloor i/2^6 \rfloor$, $m_2 = \lfloor \mathrm{mod}(i, 2^6), 2^3 \rfloor$, and $m_3 = \mathrm{mod}(\mathrm{mod}(i, 2^6), 2^3)$. |

For comparison, four possible comparative codebooks are given below.

Codebook 2: the single-polarized coefficient $w'_k$ is selected from a universal set $A_w = \{w'_{k_3} = [1, e^{j\pi k_3/2^7}, e^{j\pi k_3/2^7}, e^{j3\pi k_3/2^7}]^T, k_3 = 0, \ldots, 2^8 - 1\}$ of candidate $w'_k$ values. The codebook is formed as shown in Table 2 below:

TABLE 2

Codebook 2

| Codeword index | Codeword matrix |
|---|---|
| $i = 0, \ldots, 2^8 - 1$ | $w_i = \dfrac{1}{2\sqrt{2}} \begin{pmatrix} w'_i \\ w'_i \end{pmatrix}$ |

Codebook 3: $\delta_k$ is selected from a universal set $A_\delta = \{\delta_{k_2} = k_2 \pi/8, k_2 = 0, \ldots, 2^4 - 1\}$ of the candidate $\delta_k$ values; the single-polarized coefficient $w'_k$ is selected from a universal set $A_w = \{w'_{k_3} = [1, e^{-j\pi k_3/8}, e^{-j2\pi k_3/4}, e^{-j3\pi k_3/8}]^T, k_3 = 0, \ldots, 2^4 - 1\}$ of candidate $w'_k$ values. The codebook is formed as shown in Table 3 below:

TABLE 3

Codebook 3

| Codeword index | Codeword matrix |
|---|---|
| $i = 0, \ldots, 2^8 - 1$ | $w_i = \dfrac{1}{2\sqrt{2}} \begin{pmatrix} w'_{m_3} \\ e^{j\delta_{m_2}} w'_{m_3} \end{pmatrix}$ with $m_2 = \lfloor i, 2^4 \rfloor$ and $m_3 = \mathrm{mod}(i, 2^4)$. |

Codebook 4: $\delta_k$ is selected from a universal set $A_\delta = \{\delta_{k_2} \pi/16, k_2 = 0, \ldots, 2^5 - 1\}$ of the candidate $\delta_k$ values; the single-polarized coefficient $w'_k$ is selected from a universal set $A_w = \{w'_{k_3} = [1, e^{-j\pi k_3/4}, e^{-j\pi k_3/2}, e^{-j3\pi k_3/4}]^T, k_3 = 0, \ldots, 2^3 - 1\}$ of candidate $w'_k$ values. The codebook is formed as shown in Table 4 below:

TABLE 4

Codebook 4

| Codeword index | Codeword matrix |
|---|---|
| $i = 0, \ldots, 2^8 - 1$ | $w_i = \dfrac{1}{2\sqrt{2}} \begin{pmatrix} w'_{m_3} \\ e^{j\delta_{m_2}} w'_{m_3} \end{pmatrix}$ |

TABLE 4-continued

Codebook 4

| Codeword index | Codeword matrix |
|---|---|
| | with $m_2 = \mathrm{mod}(i, 2^5)$ and $m_3 = \lfloor i, 2^5 \rfloor$. |

Codebook 5: $\delta_k$ is selected from a universal set $A_\delta = \{\delta_{k_2} = k_2 \pi/4, k_2 = 0, \ldots, 2^3 - 1\}$ of candidate $w'_k$ values; the single-polarized coefficient $w'_k$ is selected from a universal set $A_w = \{w'_{k_3} = [1, e^{-j\pi k_3/16}, e^{-j3\pi k_3/8}, e^{-j3\pi k_3/16}]^T, k_3 = 0, \ldots, 2^5 - 1\}$ of candidate $w'_k$ values. The codebook is formed as shown in Table 5 below:

TABLE 5

Codebook 5

| Codeword index | Codeword matrix |
|---|---|
| $i = 0, \ldots, 2^8 - 1$ | $w_i = \dfrac{1}{2\sqrt{2}} \begin{pmatrix} w'_{m_3} \\ e^{j\delta_{m_2}} w'_{m_3} \end{pmatrix}$ with $m_2 = \lfloor i, 2^5 \rfloor$ and $m_3 = \mathrm{mod}(i, 2^5)$. |

The precoding scheme using the Codebook 1 according to the present invention and the precoding scheme using one of the four comparative codebooks Codebooks 2-5 are simulated in performance. Table 6 below gives simulation assumptions.

TABLE 6

Simulation assumptions

| Parameter | Assumptions used for evaluation |
|---|---|
| Deployment scenario | 3GPP case 1 3D, SCM-UMa with large angle spread. Speed: 3 km/h |
| Antenna configuration (eNodeB) | 8 transmitting antennas, Cross-polarized antenna (CLA), a spacing of 0.5 wavelengths between antennas: +/−45 degrees |
| Antenna configuration (UE) | 2 receiving antennas, A pair of cross-polarized antennas, A polarized angle +90/0 degrees |
| Number of layers | the number of layers of data stream per UE is 1 |
| Feedback granularity | Subband |
| Codeword selection criterion | Maximizing the modulus of the inner product of the dominant eigenvector $v_1$ and codeword $w = \arg\max_{w_i \in C} |v_1^H w_i|$ |
| Metric | Quantization error: $QE = 1 - |v_1^H w|^2$ |

Table 7 shows mean quantization error obtained by simulating the precoding schemes respectively using the above five codebooks. FIG. 3 shows a cumulative distribution function of quantization error.

TABLE 7

Mean quantization error

| Codebook | Codebook 1 | Codebook 2 | Codebook 3 | Codebook 4 | Codebook 5 |
|---|---|---|---|---|---|
| Mean QE | 0.17 | 0.53 | 0.20 | 0.24 | 0.38 |

As can be seen from FIG. 3 and Table 7, the precoding scheme using the recommended codebook (Codebook 1) designed with the principle of complex scaling proposed in this invention outperforms the precoding scheme using the other option codebooks (Codebooks 2-5) with respect to quantization error.

Besides, the codebook/precoder design principle of complex scaling proposed in this invention can also be used to enhance the performance of two-stage feedback approaches, e.g., GoB-based feedback approach as proposed in R1-104164, "Way forward on 8Tx codebook for Rel.10 DL MIMO", CATT et al., 3GPP TSG RAN1 WG1 61b. In the following, complex scaling according to the present invention is used to enhance codebook $C_2$ for feedback codeword $W_2$ in the GoB-based feedback scheme proposed in R1-104164 to improve the performance of the precoder.

In an exemplary case, with the 2-bit enhancement, codebook $C_2$ is as follows.

Rank 1:

$$W_2 \in C_2 = \left\{ \frac{1}{\sqrt{2}} \begin{bmatrix} Y \\ Y \end{bmatrix}, \frac{1}{\sqrt{2}} \begin{bmatrix} Y \\ jY \end{bmatrix}, \frac{1}{\sqrt{2}} \begin{bmatrix} Y \\ Y \end{bmatrix}, \frac{1}{\sqrt{2}} \begin{bmatrix} Y \\ -jY \end{bmatrix} \right\}$$

$$\cup \left\{ \begin{array}{c} \frac{4}{\sqrt{17}} \begin{bmatrix} Y \\ 0.25Y \end{bmatrix}, \frac{4}{\sqrt{17}} \begin{bmatrix} Y \\ j0.25Y \end{bmatrix}, \\ \frac{4}{\sqrt{17}} \begin{bmatrix} Y \\ -0.25Y \end{bmatrix}, \frac{4}{\sqrt{17}} \begin{bmatrix} Y \\ -j0.25Y \end{bmatrix} \end{array} \right\}$$

$$\cup \left\{ \begin{array}{c} \frac{2}{\sqrt{5}} \begin{bmatrix} Y \\ 0.5Y \end{bmatrix}, \frac{2}{\sqrt{5}} \begin{bmatrix} Y \\ j0.5Y \end{bmatrix}, \\ \frac{2}{\sqrt{5}} \begin{bmatrix} Y \\ -0.5Y \end{bmatrix}, \frac{2}{\sqrt{5}} \begin{bmatrix} Y \\ -j0.5Y \end{bmatrix} \end{array} \right\}$$

$$\cup \left\{ \frac{1}{\sqrt{5}} \begin{bmatrix} Y \\ 2Y \end{bmatrix}, \frac{1}{\sqrt{5}} \begin{bmatrix} Y \\ j2Y \end{bmatrix}, \frac{1}{\sqrt{5}} \begin{bmatrix} Y \\ -2Y \end{bmatrix}, \frac{1}{\sqrt{5}} \begin{bmatrix} Y \\ -j2Y \end{bmatrix} \right\}$$

wherein $Y \in \{\tilde{e}_1, \tilde{e}_2, \tilde{e}_3, \tilde{e}_4\}$.

Rank 2:

$$W_2 \in C_2 = \left\{ \frac{1}{2} \begin{bmatrix} Y_1 & Y_2 \\ Y_1 & -Y_2 \end{bmatrix}, \frac{1}{2} \begin{bmatrix} Y_1 & Y_2 \\ jY_1 & -jY_2 \end{bmatrix} \right\}$$

$$\cup \left\{ \frac{4}{17} \begin{bmatrix} Y_1 & Y_2 \\ 0.25Y_1 & -4Y_2 \end{bmatrix}, \frac{4}{17} \begin{bmatrix} Y_1 & Y_2 \\ j0.25Y_1 & -j4Y_2 \end{bmatrix} \right\}$$

$$\cup \left\{ \frac{2}{5} \begin{bmatrix} Y_1 & Y_2 \\ 0.5Y_1 & -2Y_2 \end{bmatrix}, \frac{2}{5} \begin{bmatrix} Y_1 & Y_2 \\ j0.5Y_1 & -j2Y_2 \end{bmatrix} \right\}$$

$$\cup \left\{ \frac{2}{5} \begin{bmatrix} Y_1 & Y_2 \\ 2Y_1 & -0.5Y_2 \end{bmatrix}, \frac{2}{5} \begin{bmatrix} Y_1 & Y_2 \\ j2Y_1 & -j0.5Y_2 \end{bmatrix} \right\}$$

wherein $(Y_1, Y_2) \in \{(\tilde{e}_1, \tilde{e}_1), (\tilde{e}_2, \tilde{e}_2), (\tilde{e}_3, \tilde{e}_3), (\tilde{e}_4, \tilde{e}_4), (\tilde{e}_1, \tilde{e}_2), (\tilde{e}_2, \tilde{e}_3),$
$(\tilde{e}_1, \tilde{e}_4), (\tilde{e}_2, \tilde{e}_4)\}$.

Note: notation $\tilde{e}_n$ is a 4×1 selection vector with all zeros except for the $n^{th}$ element with value 1.

In order to simulate the performance of the precoding scheme using the above codebook, Table 8 below gives simulation assumptions.

TABLE 8

Simulation assumptions

| Parameter | Assumptions used for evaluation |
|---|---|
| Deployment scenario | 3GPP case 1 3D, SCM-UMa with high angle spread (15 deg) and low angle spread (8 deg); ITU UMi |
| Cell number | 19 cells with 3 sectors per cell |
| Wrap-around model | Yes |
| Duplex method and bandwidths | FDD: 10 MHz for downlink |
| Network synchronization | Synchronized |
| Traffic model | Full-buffer |
| UE number per sector | 10 |
| Maximal number of co-scheduled UE | 4 |
| Handover margin | 1.0 dB |
| eNB Antenna assumptions | 8 Tx, cross-polarized antennas (CLAs) with 0.5-lambda spacing: +/− 45 degrees |
| UE antenna assumptions | 2 Rx, one pair of cross-polarized antennas with polarization angles of +90/0 degrees |
| UE antenna orientation | Random distribution within range [−90, 90] degrees |
| Calibrated antenna array | Ideal |
| Downlink transmission scheme | Dynamic SU/MU-MIMO switching |
| Downlink scheduler | Proportional fair, frequency selective |
| Feedback assumptions (feedback periodicity in time domain, feedback granularity in frequency domain) | Long-term/wideband W1 and short-term/sub-band W2, and sub-band CQI. Sub-band CQI report: 5 ms periodicity, 6 ms delay, with measurement error: N(0, 1 dB) per PRB. W1 and W2 report: 5 ms periodicity for both W1 and W2, and 6 ms feedback delay |
| CQI | SU-CQI for SU-MIMO and low-bound MU-CQI for MU-MIMO |
| Downlink HARQ scheme | Synchronous HARQ, Chase combining |
| Downlink receiver type | MMSE |
| CSI-RS based CSI estimation error | Real |
| DM-RS channel estimation | Real |
| Feedback error | Yes, 1% codeword error rate |
| HARQ | Chase combing with max 4 retransmissions |
| Control channel and reference signal overhead | As agreed in ITU assumption with PDCCH of 3 OFDM symbols: 0.3063 |

Table 9 below gives system-level simulation results.

TABLE 9

System-level simulation results on GoB based two-stage feedback

| Scheme | Average Spectral Efficiency SE (bps/Hz/cell) | Edge Spectrum Efficiency SE (bps/Hz/user) |
|---|---|---|
| GoB in R1-104164 | 3.52 | 0.102 |
| Complex scaling based GoB | 3.76 | 0.121 |
| Gain: Complex scaled/ R1-104164 | 7% | 18.6% |

Table 9 shows that the GoB based two-stage feedback scheme enhanced by complex scaling according to the present invention achieves good gain over the GoB based two-stage feedback scheme proposed in R1-104164 with respect to average spectral efficiency and edge spectral efficiency.

The description has already been described in combination with preferred embodiments. Those skilled in the art appreciate that various other modifications, substitutions and additions can be made without departing from the spirit and scope of the present invention. Therefore, the scope of the present invention is not limited to the above specific embodiments and shall be defined with the appended claims.

What is claimed is:

1. A precoding method for a cross-polarized antenna array, the cross-polarized antenna array comprising a first group of coplanar polarized antennas and a second group of coplanar polarized antennas, the method comprising:
generating, for at least one layer of data stream, a feedback codebook comprising a plurality of codewords;
receiving a selection of the codeword in the feedback codebook;
determining a corresponding codeword from the feedback codebook according to the received selection;
generating a precoding matrix based on the determined codeword to precode the at least one layer of data stream;
wherein each codeword in the feedback codebook comprises a first coefficient portion corresponding to the first group of coplanar polarized antennas and a second coefficient portion corresponding to the second group of coplanar polarized antennas, and there is a complex scaling relation between the coefficients in the first coefficient portion and the second coefficient portion corresponding to the same layer of data stream.

2. The method according to claim 1, wherein the complex scaling relation comprises amplitudes and phases; the coefficient in the feedback codebook corresponding to each layer of data stream is generated according to a plurality of complex scaling coefficients consisting of a plurality of candidate amplitudes and a plurality of candidate phases, and a plurality of candidate single-polarized coefficients.

3. The method according to claim 2, wherein the plurality of candidate amplitudes are pre-set according to channel characteristics of the cross-polarized antenna array.

4. The method according to claim 2, wherein the plurality of candidate amplitudes can include 1 and/or a pair of values which are mutually reciprocal.

5. The method according to claim 2, wherein the plurality of candidate phases comprise phase values evenly distributed in a predetermined range.

6. The method according to claim 5, wherein the predetermined range is 0 to $2\pi$.

7. The method according to claim 1, wherein the cross-polarized antenna array is a closely spaced-apart linear antenna array, and the first coefficient portion and/or the second coefficient portion comprise Discrete Fourier Transformation DFT vectors.

8. The method according to claim 1, wherein selection of the codeword includes an index of the codeword in the feedback codebook.

9. A precoder for a cross-polarized antenna array, the cross-polarized antenna array comprising a first group of coplanar polarized antennas and a second group of coplanar polarized antennas, the precoder comprising:
a feedback codebook generating unit configured to generate, for at least one layer of data stream, a feedback codebook comprising a plurality of codewords;
a receiving unit configured to receive a selection of the codeword in the feedback codebook;
a determining unit configured to determine a corresponding codeword from the feedback codebook according to the selection received by the receiving unit; and
a precoding unit configured to generate a precoding matrix based on the codeword determined by the determining unit to precode the at least one layer of data stream;
wherein the feedback codebook generating unit is configured such that each codeword in the generated feedback codebook comprises a first coefficient portion corresponding to the first group of coplanar polarized antennas and a second coefficient portion corresponding to the second group of coplanar polarized antennas, and there is a complex scaling relation between the coefficients in the first coefficient portion and the second coefficient portion corresponding to the same layer of data stream.

10. The precoder according to claim 9, wherein the complex scaling relation comprises amplitudes and phases; the feedback codebook generating unit is configured to generate a coefficient in the feedback codebook corresponding to each layer of data stream according to complex scaling coefficients consisting of a plurality of candidate amplitudes and a plurality of candidate phases, and a plurality of candidate single-polarized coefficients.

11. The precoder according to claim 10, wherein the feedback codebook generating unit is configured to set the plurality of candidate amplitudes according to channel characteristics of the cross-polarized antenna array.

12. The precoder according to claim 9, wherein the feedback codebook generating unit is configured to set the plurality of candidate amplitudes to include 1 and/or a pair of values which are mutually reciprocal.

13. The precoder according to claim 9, wherein the feedback codebook generating unit is configured to set the plurality of candidate phases to be phase values evenly distributed in a predetermined range.

14. The precoder according to claim 13, wherein the predetermined range is 0 to $2\pi$.

15. The precoder according to claim 9, wherein the cross-polarized antenna array is a closely spaced-apart linear antenna array, and the first coefficient portion and/or the second coefficient portion comprise Discrete Fourier Transformation DFT vectors.

16. The precoder according to claim 9, wherein, the receiving unit is configured to receive an index in the feedback codebook.

* * * * *